(12) United States Patent
Sasaki et al.

(10) Patent No.: US 9,597,725 B2
(45) Date of Patent: Mar. 21, 2017

(54) HOT FORGING DIE

(71) Applicant: HITACHI METALS, LTD., Minato-ku, Tokyo (JP)

(72) Inventors: Shohei Sasaki, Yasugi (JP); Koji Sato, Tokyo (JP); Hideki Matsumoto, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/387,847

(22) PCT Filed: Mar. 29, 2013

(86) PCT No.: PCT/JP2013/059518
§ 371 (c)(1),
(2) Date: Sep. 25, 2014

(87) PCT Pub. No.: WO2013/147154
PCT Pub. Date: Oct. 3, 2013

(65) Prior Publication Data
US 2015/0040639 A1  Feb. 12, 2015

(30) Foreign Application Priority Data

Mar. 30, 2012 (JP) ................................. 2012-079311

(51) Int. Cl.
*B21J 13/02* (2006.01)
*B21J 5/02* (2006.01)
(Continued)

(52) U.S. Cl.
CPC .............. *B21J 13/02* (2013.01); *B21J 5/025* (2013.01); *B21K 5/20* (2013.01); *B22F 3/17* (2013.01);
(Continued)

(58) Field of Classification Search
CPC ... B21J 13/02; B21J 13/025; B21J 5/00; B21J 5/025; B21K 5/20
See application file for complete search history.

(56) References Cited

U.S. PATENT DOCUMENTS

| | | | | |
|---|---|---|---|---|
| 5,406,825 A | * | 4/1995 | Horie | ....................... B21J 13/02 72/358 |
| 7,805,971 B2 | * | 10/2010 | Cairo | ........................ B21J 5/00 72/353.6 |
| 2009/0133462 A1 | | 5/2009 | Cairo et al. | |

FOREIGN PATENT DOCUMENTS

| | | | | |
|---|---|---|---|---|
| EP | 0960683 A1 | | 12/1999 | |
| FR | 0960683 A1 | * | 12/1999 | .............. B21J 13/02 |

(Continued)

OTHER PUBLICATIONS

Machine translation of foreign documents are attached.*
(Continued)

*Primary Examiner* — Peter DungBa Vo
*Assistant Examiner* — John S Lowe
(74) *Attorney, Agent, or Firm* — SOLARIS Intellectual Property Group, PLLC

(57) ABSTRACT

Provided is an inexpensive hot forging die which allows a desired shape to be obtained even from a large-sized forging material.
A hot forging die, for closed die hot forging of a material to be forged, includes a plurality of ring-shaped die pieces which are combined concentrically and fastened with each other, wherein an axial direction of the ring-shaped die pieces is identical with a pressing direction when the material is forged, and wherein a die face and a build-up layer of a nickel-base super heat-resistant alloy are formed at a part of the hot forging die, which is brought into contact with the material to be forged.

4 Claims, 7 Drawing Sheets

(51) Int. Cl.
*B21K 5/20* (2006.01)
*B23K 10/02* (2006.01)
*B23P 15/24* (2006.01)
*B22F 3/17* (2006.01)
*C22C 1/04* (2006.01)
*C22C 19/05* (2006.01)
*C22F 1/10* (2006.01)

(52) U.S. Cl.
CPC ............ *B23K 10/027* (2013.01); *B23P 15/24* (2013.01); *C22C 1/0433* (2013.01); *C22C 19/055* (2013.01); *C22F 1/10* (2013.01); *C22C 19/056* (2013.01)

(56) References Cited

FOREIGN PATENT DOCUMENTS

| | | | |
|---|---|---|---|
| JP | 5816941 U | * | 11/1983 |
| JP | 58166941 U | * | 11/1983 |
| JP | S58-166941 U | | 11/1983 |
| JP | 2001-071086 A | | 3/2001 |
| JP | 2002-192290 | | 7/2002 |
| JP | 2006-255767 A | | 9/2006 |
| JP | 2009-066661 A | | 4/2009 |
| JP | 2010037564 A | * | 2/2010 |
| JP | 2012-024779 A | | 2/2012 |
| JP | 2012024779 A | * | 2/2012 |
| WO | 2010/074017 A1 | | 7/2010 |

OTHER PUBLICATIONS

Original documents and machine translation are attached for EP0960683A1; JP58166941U; JP2012024779.*

English language translation of the following: Office action dated Jan. 6, 2015, from the JPO in a Japanese patent application corresponding to the instant patent application. This office action translation is submitted now in order to supplement the understanding of the cited references which are being disclosed in the instant Information Disclosure Statement.

Office Action dated Mar. 15, 2016, issued by Japan Patent Office in a Japanese patent application corresponding to the instant patent application. A translation of the Japanese Office Action is submitted herewith.

* cited by examiner

HOT FORGING DIE

TECHNICAL FIELD

The present invention relates to a hot forging die.

BACKGROUND ART

In recent years, demands for hot closed die forged products for middle- to large-sized aircrafts are markedly growing. Of these hot closed die forged products for middle- to large-sized aircrafts, for example, turbine disks for aircraft jet engines are made of a nickel alloy or titanium alloy, and they are concentric and have a diameter of greater than 1 meter. For producing these large-sized forged products, the deformation load during hot closed die forging requires a markedly high pressure more than 150 MN.

For example, hot forging dies most suitable for hot forging of large-sized forged products having a concentric form and high deformation resistance, such as turbine disks for aircraft jet engines and gas turbine disks for generation, have been produced by cutting out from a very large monolithic material block. As a result of this, the material blocks used to make the die has a weight of more than 5 tons, and the die is required to be produced from a large-sized steel ingot having a dissolution weight of more than 10 tons. In addition, many materials are scrapped during die-sinking, which presents the problem of poor productivity.

In order to solve the above-described problems, a method of producing a large-sized die assembled from a plurality of die pieces is proposed. For example, Japanese Patent Application Laid-Open (JP-A) No. 2009-66661 (Patent document 1) discloses a method of assembling and integrating a plurality of die pieces arranged in a radial pattern.

PRIOR ART DOCUMENT

Patent Document

Patent Document 1: Japanese Patent Application Laid-Open (JP-A) No. 2009-66661

SUMMARY OF INVENTION

Technical Problem

According to the method described in Patent Document 1, a plurality of die pieces freely moves in the radial direction in conformity with the movement of the material to be forged under deformation during processing of the material to be forged. More specifically, during the forging cycle for deforming the material to be forged by a die, the flow of the material to be forged toward the outside in the radial direction is automatically supported by the simultaneous movement of the die pieces toward the outside in the radial direction, and the resultant growth of the material to be forged in the radial direction during forging is promoted without inhibiting it by friction with die pieces, whereby the crack occurrence rate of the forged product is reduced.

Therefore, the forging material after completion of hot forging is forged only at the part being in contact with the die pieces, and the material to be forged invades into the gaps between the moved die pieces, which makes it difficult to make the part into the desired shape.

The object of the present invention is to provide an inexpensive hot forging die which allows a desired shape to be obtained even from a large-sized forging material.

Solution to Problem

The present invention has been accomplished in view of the above-described problem.

More specifically, an aspect of the present invention is a hot forging die for closed die hot forging of a material to be forged, the hot forging die comprising a plurality of ring-shaped die pieces which are combined concentrically and fastened with each other, wherein an axial direction of the ring-shaped die pieces is identical with a pressing direction when the material is forged, and wherein a die face and a build-up layer of a nickel-base super heat-resistant alloy are formed at a part of the hot forging die, which is brought into contact with the material to be forged.

Another aspect of the present invention is a hot forging die, wherein a stepped portion is formed at an inner periphery or an outer periphery of the ring-shaped die pieces.

Yet another aspect of the present invention is a hot forging die, wherein die faces of the ring-shaped die pieces are at one end face in the axial direction, and a periphery, a diameter of which decreases from another end face toward the one end face in the axial direction, is formed at the inner periphery or the outer periphery of the ring-shaped die pieces.

The hot forging die is preferably a hot forging die wherein the plurality of ring-shaped die pieces are fastened by shrink fitting.

The hot forging die is more preferably a hot forging die, wherein a composition of the build-up layer is, in terms of % by mass, B at 0.02% or less, C at from 0.01 to 0.15%, Mg at 0.01% or less, Al at from 0.5 to 2%, Si at 1% or less, Mn at 1% or less, Ti at from 1.5 to 3%, Cr at from 15 to 22%, Co at from 5 to 15%, Mo at from 3 to 6%, W at from 3 to 6%, Nb at 4% or less, Ta at from 1 to 7%, a content of Ta alone or the sum of Ta+2Nb being from 1 to 7%, and the balance being Ni and impurities.

Advantageous Effects of Invention

The hot forging die of the present invention allows the production of dies in high yields, can be used as a closed hot forging die for a large-sized aircraft jet engine disks and large-sized gas turbine disks for generation, which have been difficult to make by prior art, and therefore allows a long die life to be achieved, and low cost and high quality large-sized closed forged products to be produced.

DESCRIPTION OF EMBODIMENTS

An important feature of the present invention is the structure of an integral hot forging die made by concentrically fitting a plurality of die pieces together.

Figure 1:
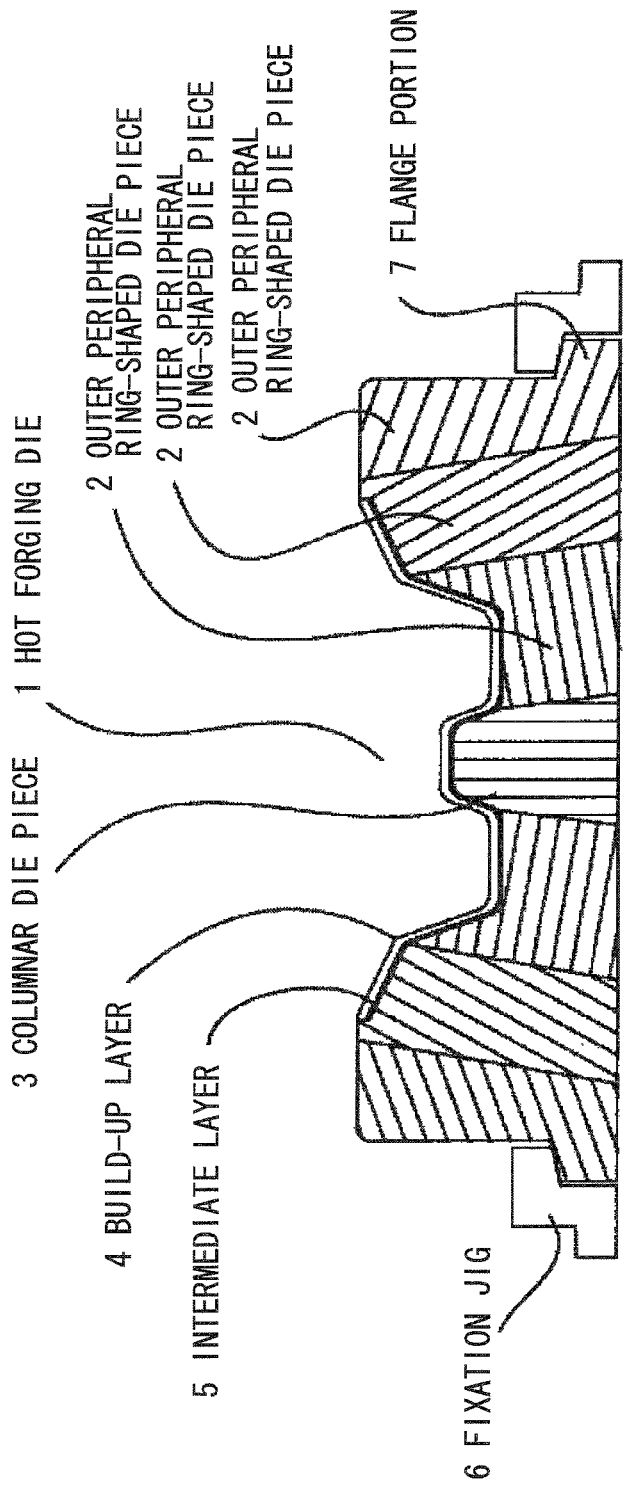
FIG. 1 is a cross sectional view of the hot forging die according to an aspect of the present invention, which cuts across the hot forging die at the plane containing the central axis of the hot forging die.
Figure 2:
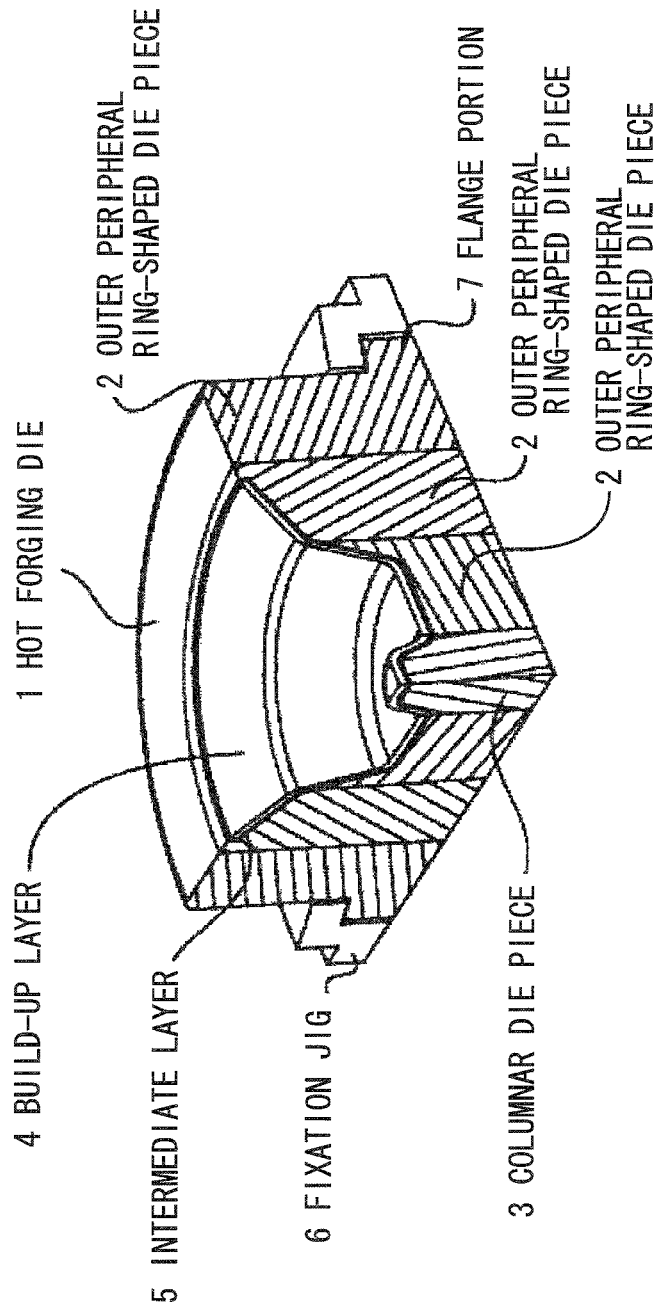
FIG. 2 is a perspective view of the hot forging die according to an aspect of the present invention, containing a partial cross section of the hot forging die.

For example, as shown in FIGS. 1 and 2, a columnar die piece 3 is used as the center of the assemble, and outer peripheral ring-shaped die pieces 2 are assembled concentrically to fit with each other around the columnar die piece 3, and fastened to integrate these components, thereby making a hot forging die 1. This structure is used for, for example, producing a hot forging material in a disk form.

Figure 3:
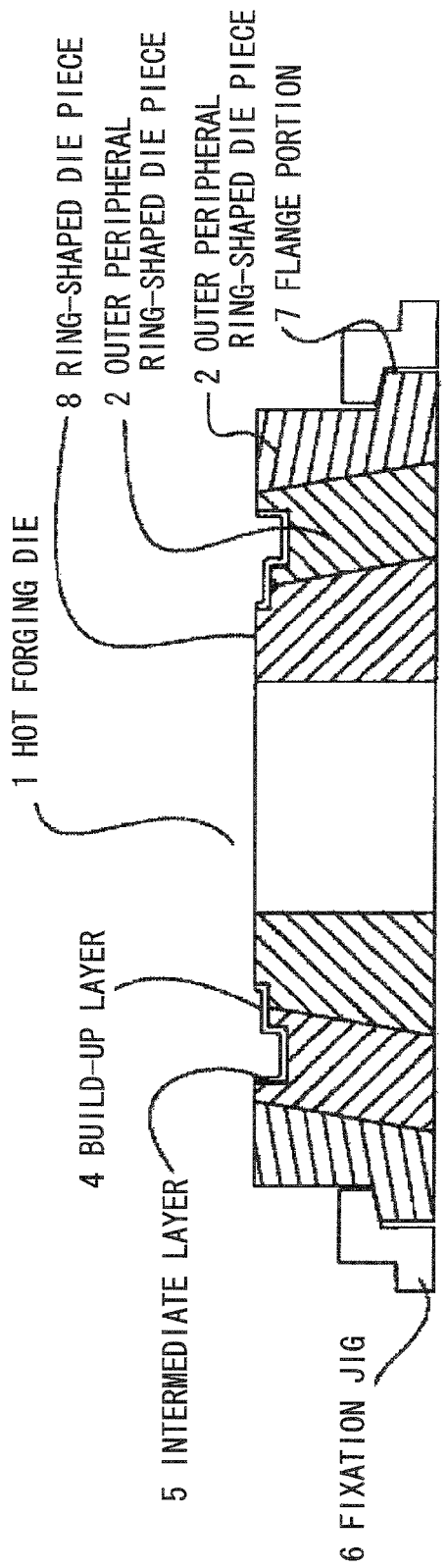
FIG. 3 is a cross sectional view of the hot forging die according to another aspect of the present invention, which cuts across the hot forging die at the plane containing the central axis of the hot forging die.
Figure 4:
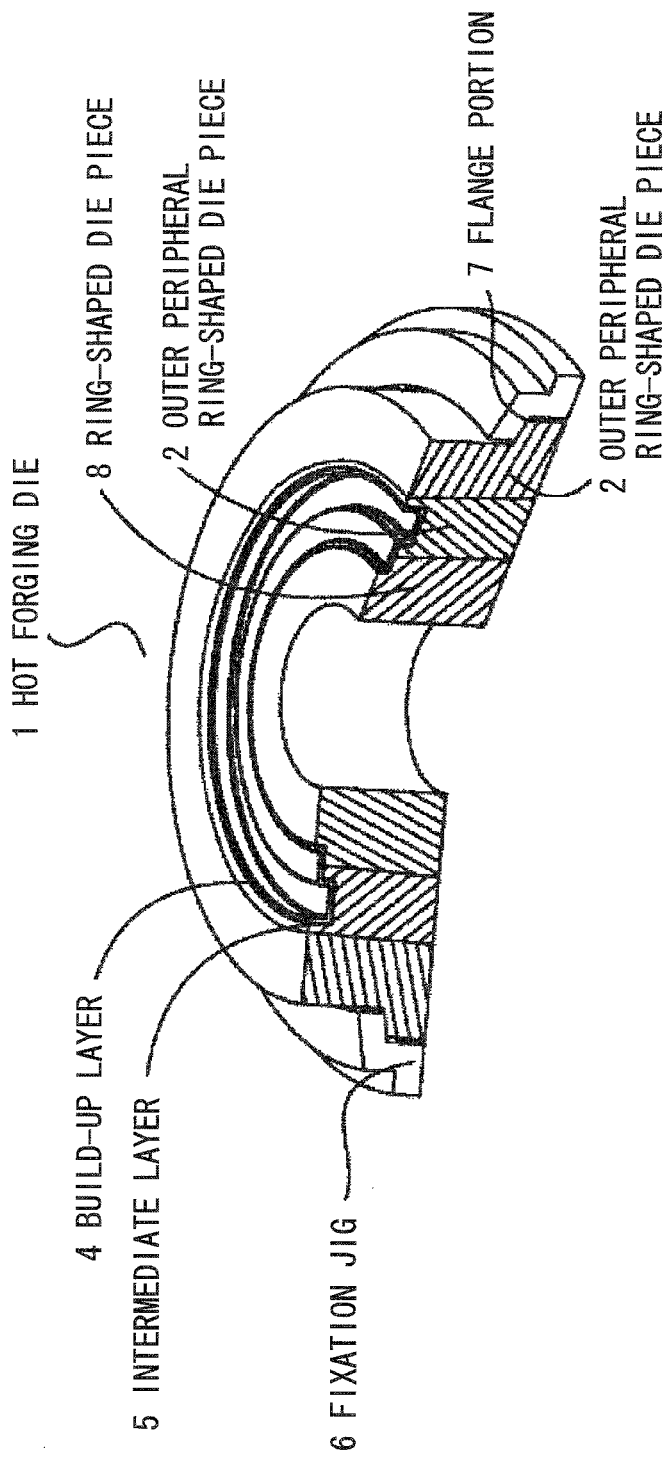
FIG. 4 is a perspective view of the hot forging die according to another aspect of the present invention, containing a partial cross section of the hot forging die.

Alternatively, for example, as shown in FIGS. 3 and 4, a ring-shaped die piece 8 is used as the center of the assemble, and outer peripheral ring-shaped die pieces 2 are assembled concentrically to fit with each other around the ring-shaped die piece 8, and fastened to integrate these components, thereby making a hot forging die 1. This structure is used for, for example, producing a ring-shaped hot forging material.

For both of the structures, several outer peripheral ring-shaped die pieces are fitted together concentrically according to the size of the material to be processed, whereby the diameter of the hot forging die can be increased. In addition, the die pieces bind with each other, so that the strength of the die is comparable to that of a monolithic die. In addition, a plurality of die pieces are fitted together, so that the number of man-hours for cutting out during die making is reduced, and productivity is improved, in comparison with the prior art production of a die by cutting out a die from a very large monolithic material block. As a result of this, for example, the material to be forged will not be partially insufficiently forged as described in Patent Document 1, and the desired shape can be formed. In addition, the hot forging die of the present invention allows build-up welding for each die piece, so that the time necessary for build-up welding can be reduced.

When the die pieces defined in the present invention are produced, for example, the columnar die piece composing the center part is easily made by machining a columnar die piece material prepared. In addition, the ring-shaped die piece and outer peripheral ring-shaped die piece are easily made by making a ring-shaped die piece material and an outer peripheral ring-shaped die piece material by hollow forging using a mandrel (mandrel forging) or ring mill rolling, and processing the materials into the desired dimension by machining Furthermore, in the present invention, a die face is formed in the axial direction of the die. The axial direction means, for example, for the case of the hot forging die shown in FIG. 1, the height (depth) direction of the die piece. In the present invention, the axial direction of the ring-shaped die pieces is identical with the pressing direction during forging of the material to be forged, and the hot forging material is formed into the desired shape by forming the die face at a part of the hot forging die, which is brought into contact with the material to be forged.

Furthermore, the present invention requires the formation of a build-up layer of a nickel-base super heat-resistant alloy at a part of the hot forging die, which is brought into direct contact with the material to be processed. The formation of the build-up layer of a nickel-base super heat-resistant alloy improves the hot strength of a surface to be brought into contact with the material to be processed.

The build-up layer of a nickel-base super heat-resistant alloy has the highest temperature of the parts in direct contact with the material to be processed. For example, a hot forging die having a markedly long life even when used for hot closed forging of an aircraft jet engine disk or a large-sized gas turbine disk for generation will be obtained by selecting, for example, the below-described alloy containing Ta or the alloy having the composition equivalent to that of Udimet 520 (Udimet is the registered trademark of Special Metals), Udimet 720, Waspaloy (Waspaloy is the registered trademark of United Technologies), or Alloy 718.

It is preferred that one or more of the columnar die piece, ring-shaped die pieces, and outer peripheral ring-shaped die pieces is made of alloy tool steel. In the present invention, the die pieces are made of alloy tool steel for securing rigidity of the die. The alloy tool steel material herein is selected from, for example, those defined in JIS-G4404. Among them, those suitable for hot use are preferred. The alloy is typically composed of, in terms of % by mass, C at from 0.25 to 0.5%, N at more than 0 but 0.03% or less, Si at more than 0 but 1.2% or less, Mn at more than 0 but 0.9% or less, Al at from 0 to 0.5%, P at from 0 to 0.03%, S at from 0 to 0.01%, V at from 0 to 2.1%, Cr at from 0.8 to 5.5%, Ni at from 0 to 4.3%, Cu at from 0 to 0.3%, Mo at from 0 to 3.0%, W at from 0 to 9.5%, Co at from 0 to 4.5%, and the balance being Fe and impurities.

The alloy is more preferably composed of, in terms of % by mass, C at from 0.35 to 0.42%, N at more than 0 but 0.03% or less, Si at from 0.3 to 1.2%, Mn at from 0.3 to 0.7%, Al at more than 0 but 0.025% or less, P at from 0 to 0.03%, S at from 0 to 0.01%, V at from 0.50 to 1.10%, Cr at from 4.80 to 5.50%, Ni at more than 0 but 0.25% or less, Cu at more than 0 but 0.15% or less, Mo at from 1.2 to 2.7%, and the balance being Fe and impurities.

The materials of these die pieces may be composed of different materials. However, if the thermal expansion properties are different, for example, shrink fitting may be difficult. Therefore, if different materials are used, their thermal expansion properties are preferably similar. In consideration of the thermal expansion properties and mechanical properties, all the die pieces (columnar die piece, ring-shaped die piece, and outer peripheral ring-shaped die pieces) are preferably composed of the same material.

Figure 5:
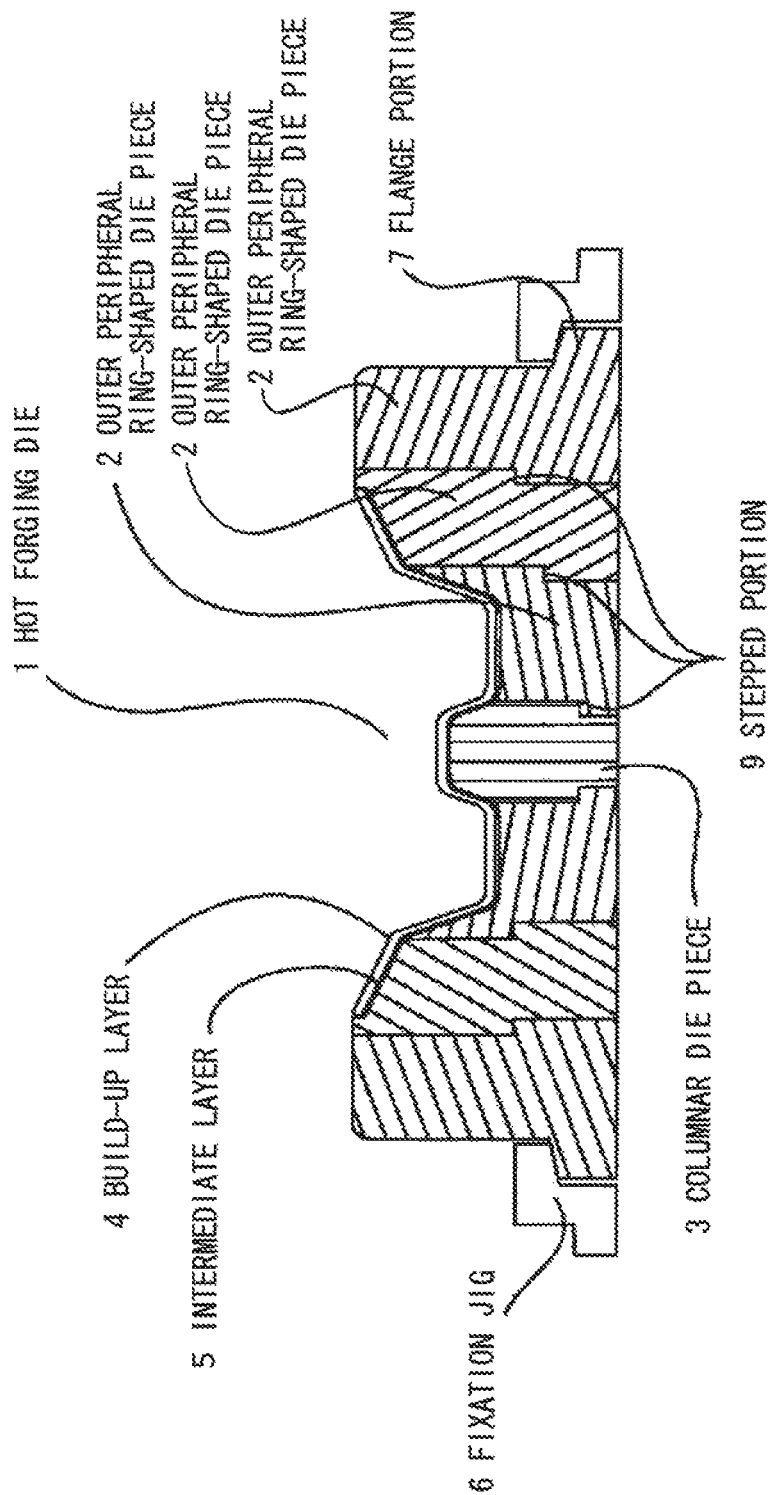
FIG. 5 is a cross sectional view of the hot forging die according to another aspect of the present invention, which cuts across the hot forging die at the plane containing the central axis of the hot forging die.

As shown in FIG. 5, the ring-shaped die pieces 2 and columnar die piece 3 preferably have stepped portions 9 at the points to be fitted, for receiving the load imposed during forging. The stepped portions 9 receive the load imposed during hot forging at the steps, and certainly prevents deviation of the die pieces. Therefore, for example, when the die pieces are assembled by the below-described shrink fitting, disengagement of the points which have been bound by shrink fitting is effectively prevented.

In addition, in the present invention, as shown in FIGS. 1 and 3, a periphery, a diameter of which decreases from another end face toward the one end face in the axial direction, may be formed at the inner periphery or the outer periphery of the ring-shaped die piece. For example, when the hot forging die of the present invention is used as an upper die, dropping of the die pieces is securely prevented by decreasing the diameter of the die pieces in order from the side opposite to the surface to be brought into contact with the material to be forged (working surface). The method for fitting and fastening the die pieces may be, for example, simple fitting, or shrink fitting or cold fitting.

Among them shrink fitting is preferred because die pieces can be readily fitted with each other.

The composition of the build-up layer of a nickel-base super heat-resistant alloy as the outermost surface layer is described below.

The alloy composition of the build-up layer defined in the present invention is within the range established by appropriately adjusting the alloy described in Japanese Patent Application Laid-Open (JP-A) No. H02-97634 for build-up. The chemical composition is expressed as % by mass unless otherwise noted.

B: 0.02% or less

B may be added as necessary, because B is effective for improving the strength and ductility at high temperature by grain boundary reinforcement effect. However, excessive addition of B forms borides. Borides can be locally dissolved during welding to cause cracking at high temperatures. Therefore, the upper limit of B is 0.02% or less. The preferred content for achieving the effect of B is from 0.001 to 0.015%.

C: from 0.01 to 0.15%

C is composed mainly of Cr, and has the effect of discontinuously deposits $M_{23}C_6$ carbides at boundaries to reinforce the grain boundaries. Therefore, the lower limit of C is 0.01%. However, excessive C more than 0.15% will increase the formation of primary carbides and decrease ductility and toughness. Therefore, the upper limit of C is 0.15%.

Mg: 0.01% or less

Mg stabilizes O (oxygen) or S as impurity in the form of MgO or MgS, and inhibits embrittlement at grain boundaries and cracking of heat-affected zones. Therefore, Mg may be added as necessary. However, excessive Mg can increase Mg-based inclusions which decrease the strength. Therefore, the upper limit of Mg is 0.01% or less.

Al: from 0.5 to 2%

Al is an important element which combines with Ni to deposit stable γ' phases, and imparts high temperature strength during hot forging. In addition, for the alloy composition defined in the present invention, in order to improve the high temperature strength, the {Ti+Ta (+Nb)}/Al ratio in γ' phases must be increased to increase the cell constant of γ' phases, thereby increasing the lattice strain imposed by the precipitation of γ'. Therefore, in order to achieve the above-described effect, the lower limit of Al is 0.5%. On the other hand, excessive addition of Al inhibits weldability. Therefore, the upper limit of Al is 2%. The lower limit of Al is preferably 1.0%, and the upper limit of Al is preferably 1.6%.

Si: 1% or less

Si is added as a deoxidizing element. Therefore, the content more than 0% considerably remains. If Si exceeds 1%, precipitation of harmful phases and decrease of the high temperature strength occur. Therefore, the upper limit of Si is 1%, and preferably 0.5% or less.

Mn: 1% or less

Mn is added as a deoxidizing element like Si. Therefore, the content more than 0% considerably remains. If Mn exceeds 1%, precipitation of harmful phases and decrease of the high temperature strength occur. Therefore, the upper limit of Mn is 1%, and preferably 0.5% or less.

Ti: from 1.5 to 3%

Ti combines with Ni to deposit γ' phases in the same manner as Al, and increases the high temperature strength. Therefore, the lower limit of Ti is 1.5%. On the other hand, a large amount of Ti more than 3% inhibits weldability, and decreases the solid solubility of the below-described Ta into γ' phases. In addition, Ti phases ($Ni_3Ti$) deposit to decrease the strength. Therefore, the upper limit of Ti is 3.0%. The lower limit of Ti is preferably 2.1%, and the upper limit of Ti is preferably 2.7%.

Cr: from 15 to 22%

Cr dissolves in the matrix of alloy as a substitutional atom, and increases the strength, elasticity limit, and hardness. In addition, Cr improves abrasion resistance. Therefore, the lower limit of Cr is 15%. On the other hand, if Cr is more than 22%, the structure becomes unstable, and Cr as well as Mo and W tend to form σ phases which are embrittlement phases. Therefore, the upper limit of Cr is 22%. The lower limit of Cr is preferably 17%, and the upper limit of Cr is preferably 19%.

Co: from 5 to 15%

Co increases the amount of dissolved γ' in the high temperature range to improve weldability. Therefore, the lower limit of Co is 5%. On the other hand, if Co is excessive, it tends to cause precipitation of harmful phases such as Laves phases. Therefore, the upper limit of Co is 15%. The lower limit of Co is preferably 8%, and the upper limit of Co is preferably 12%.

W and Mo are important elements for increasing the initial strength.

Mo: from 3 to 6%

Mo dissolves in austenite phases, and is an element effective for reinforcing the matrix and improving the high temperature strength. The lower limit of Mo is 3%. On the other hand, Mo makes the structure unstable in the same manner as Cr. Therefore, the upper limit of Mo is 6%. The lower limit of Mo is preferably 4%, and the upper limit of Mo is preferably 5%.

W: from 3 to 6%

W is an element dissolved in the matrix, and effective for improving the tensile strength in the same manner as the above-described Mo. Therefore, the lower limit of W is 3%. On the other hand, if W is more than 6%, in the same manner as Mo, it adversely affects the stability of the structure. Therefore, the upper limit of W is 6%. The lower limit of W is more preferably 4%, and the upper limit of W is preferably 5%.

According to the preferred composition of the build-up layer defined in the present invention, γ' phases are adjusted to 20 to 45%, and aging effect is expressed at the temperature during forging. Therefore, in addition to the above-described Al and Ti, Ta is also an important element. Ta may be partially substituted with Nb.

Ta: from 1 to 7%

Ta dissolves in the Al side of $Ni_3Al$ to increase the cell constant of γ', and improves the tensile strength in the same manner as the above-described Ti. In order to achieve the above-described effect, the lower limit of Ta is 1%. On the other hand, if Ta is more than 7%, it causes the precipitation of δ phases ($Ni_3Ta$) to deteriorate ductility. Therefore, the upper limit of Ta is 7%. The content of Ta is more preferably from 3 to 5%.

Nb: 4% or less

Nb is an element belonging to the same group as Ta, and Ta may be partially substituted with Nb. However, the atomic weight of Nb is about half that of Ta. Therefore, the content of Nb is defined by Ta+2Nb. In addition, Nb improves the high temperature strength and achieves the same effect as the above-described Ta, but the effect for improving the high temperature strength is inferior to that of Ta. Therefore, Nb is added in combination with Ta. When Nb and Ta are added in combination, the content of Ta+2Nb is from 1 to 7%.

Ni as the balance is a basic element composing the austenite matrix and the γ' precipitation strengthening phase composed of Ni$_3$(Al, Ti, Ta) or Ni$_3$(Al, Ti, Ta, Nb).

The alloy of the preferred build-up layer defined in the present invention may usually include impurities such as Fe, P, S, Ca, or Zr. But they will not affect the properties as long as their content is within the below-described range, therefore, they may be contained in the alloy of the present invention.

Fe≤3%, P≤0.03%, S≤0.03%, Ca≤0.02%, Zr≤0.01%

Furthermore, among impurity elements, O (oxygen) is the element which should be particularly limited. The content of oxygen is preferably 0.050% or less. The reason for this is that O is a harmful element which oxidizes the build-up metal powder during build-up welding. In the present invention, active Ti and Al are contained. Therefore, the content of O is preferably as low as possible, and the upper limit is 0.050% or less. In order to reduce O, the build-up metal powder is preferably produced in an inert gas atmosphere. The lower limit of O is not particularly limited, but practically 0.005%.

In addition, in the present invention, for example, like the hot forging die 1 shown in FIGS. 1 and 2, an intermediate layer 5 made of a solid-solution strengthening heat-resistant alloy may be further included between the columnar die piece 3 or outer peripheral ring-shaped die piece 2 and the build-up layer 4 made of a precipitation strengthening heat-resistant alloy.

The inclusion of the intermediate layer made of a solid-solution strengthening heat-resistant alloy improves the weldability of the die piece made of alloy tool steel and the build-up layer made of a precipitation strengthening heat-resistant alloy, and more securely relaxes the stress occurring between the die piece and build-up layer, thereby further improving the life of the hot forging die. The intermediate layer may be a single layer or a laminate including two or more solid-solution strengthening heat-resistant alloys having different components.

The solid-solution strengthened heat-resistant alloy referred in the present invention may be, for example, the alloy described in ASTM-A494, or an alloy having a composition which can strengthen a matrix by dissolving an alloy element from among the alloys having the composition described in JIS-G4901 and G4902.

A typical component range of the alloy is, in terms of % by mass, C at 0.15% or less, Cr at from 15 to 30%, Co at from 0 to 3%, Mo at from 0 to 30%, W at from 0 to 10%, Nb at from 0 to 4%, Ta at from 0 to 4%, Ti at from 0 to 1%, Al at from 0 to 2%, Fe at from 0 to 20%, Mn at from 0 to 4%, and the balance being Ni and impurities.

The lamination of the nickel-base super heat-resistant alloy having the above-described composition to the working surface of the die may use a known technique such as build-up welding.

The method for build-up may be, for example, a method of build-up of the alloy in the form of wire or metal powder. Either of the methods may be used. The build-up method using powder is preferred, because the alloy containing Ta is readily segregated when the solidification rate is slow, and the method using wire requires processing into wire.

The above-described hot forging die of the present invention can be produced by the following method.

For example, for the columnar die piece, a hot forging material to be the material is subjected to heat treatment according to the material for imparting strength and toughness, thereby making a columnar die piece material.

In addition, the ring-shaped die piece and outer peripheral ring-shaped die piece are made by hollow forging using a mandrel or ring rolling. Thereafter, heat treatment according to the material is carried out to impart strength and toughness, thereby making a ring-shaped die piece material or outer peripheral ring-shaped die piece material. Whether mandrel forging or ring rolling is used for producing the ring-shaped die piece material or outer peripheral ring-shaped die piece material may be decided according to the dimension.

Thereafter, the columnar die piece material, ring-shaped die piece material, outer peripheral ring-shaped die piece material are subjected to rough processing including die face formation by machining, and adjusted to the desired dimension. Thereafter, the build-up layer of the nickel-base super heat-resistant alloy is formed. According to the present invention, the build-up layer can be formed on each die piece, so that build-up can be readily achieved on the entire face of a complicated die face.

In addition, the outside diameter part of the columnar die piece and the outside and inside diameter parts of the ring-shaped die pieces and outer peripheral ring-shaped die piece are machined for finishing, these die pieces are assembled, and then the working surface is processed by die-sinking, thereby making a hot forging die.

The outer peripheral ring-shaped die piece 2 used on the outermost periphery side may have a flange portion 7 on the side of the outer peripheral ring-shaped die piece. The flange portion 7 allows the outer peripheral ring-shaped die piece to be more securely fixed using a common fixation jig 6, so that the material cost and processing cost of the die can be reduced. In addition, when the hot forging die of the present invention is used as the upper die, the flange portion 7 more securely prevents dropping of the die pieces.

In addition, the hot forging die of the present invention can be used as a large-sized hot forging die by changing the number and dimension of the outer peripheral ring-shaped die piece.

Therefore, a hot forging die, which has been produced by cutting out from a several tons of large material, can be produced in a good yield.

In addition, the hot forging die of the present invention can be used as a large-sized die for closed die hot forging, which has been difficult to be formed integrally by prior art, which may be used under conditions where the hot deformation resistance of the material to be processed is 300 MPa or higher, the surface temperature of the die to be brought into contact with the material to be processed is 500° C. or higher, and the compressive axial load is 150 MN or higher.

The hot forging referred in the present invention includes hot press, thermostat forging, and hot die.

EXAMPLES

As the material of the columnar die 3 and outer peripheral ring-shaped die pieces 2, an alloy corresponding to alloy tool steel of JIS-SKD61 was provided. The hot forging die 1 produced at this time has the structure shown in FIGS. 3 and 4, because it is used for producing a disk.

A pancake was made from the above-described material by hot forging. Subsequently, the pancake was punched at the center, and subjected to mandrel forging to make a ring-shaped die piece material having a diameter of 1560 mm, an inside diameter of 1040 mm, and a height of 180 mm, a ring-shaped die piece material having a diameter of 1050 mm, an inside diameter of 610 mm, and a height of 180 mm, and a ring-shaped die piece material having a diameter of 620 mm, an inside diameter of 300 mm, and a height of 180 mm. The ring-shaped die piece materials thus made were adjusted to hardness of 45 HRC by hardening and tempering. The axial direction was the pressing direction during forging of the material to be forged, and the die face shown in FIG. 3 was formed by machining on the die pieces at the part to be brought into contact with the material to be forged.

Subsequently, the build-up layer 4 of two nickel-base super heat-resistant alloys was formed on the above-described die face. The build-up layer was formed as follows: the intermediate layer 5 shown in Table 1 was subjected to build-up welding, and then the nickel-base super heat-resistant alloy layer having the composition shown in Table 2 was formed on a surface (working surface) side to be brought into contact with the material to be processed of the intermediate layer 5.

The build-up welding was PTA (Plasma Transferred Arc), and Ar gas was used for preventing oxidation during welding. After build-up welding, the ring-shaped die pieces were machined into the shrink fitting shape. The shrink fitting allowance was 1.5 mm. The shrink fitting was carried out at 400° C. Then, the die pieces were assembled, and finally the working surface was subjected to die-sinking, thereby making a hot forging die.

In monolithic hot forging dies of prior art, mechanical build-up welding of deep parts such as a die face is difficult. On the other hand, the hot forging die of the present invention allows build-up welding for each die piece, so the time necessary for build-up welding was reduced by 55%. In addition, prior art monolithic hot forging dies must be cut out from materials, and the yield is about 74%, while the hot forging die of the present invention achieved a yield of about 80%.

TABLE 1

| | (% by mass) | | | | | | | |
|---|---|---|---|---|---|---|---|---|
| | C | Al | Ti | Cr | Co | Mo | W | Fe |
| Intermediate layer | 0.04 | — | — | 16.0 | — | 16.0 | 4.0 | 5.5 |

*1: The balance not shown in the table is composed of Ni and impurities.
*2: The elements represented by "—" are not added.

TABLE 2

| | (% by mass) | | | | | | | | | | | | | |
|---|---|---|---|---|---|---|---|---|---|---|---|---|---|---|
| | C | Si | Mn | Al | Ti | Cr | Co | Mo | W | Ta | Nb | [B] | [Mg] | [O] |
| Alloy A | 0.04 | 0.29 | 0.12 | 1.1 | 2.41 | 18.4 | 11.4 | 4.5 | 3.8 | 3.9 | 0.3 | 20 | 2 | 120 |
| Alloy B | 0.04 | — | — | 2.1 | 2.95 | 19.2 | 12.2 | 5.9 | 0.9 | — | — | — | — | 118 |

*1: The balance not shown in the table is composed of Ni and impurities.
*2: The elements represented by "—" are not added.
*3: The content of the elements in [ ] is ppm.

Subsequently, using the hot forging die having the above-described two build-up layers, a material corresponding to Alloy 718 which is a processing-resistant material was hot-forged into a disk. Each hot forging was carried out by 10 shots. The present hot forging die had a flange portion 7 and used a common fixation jig 6. As a result of this, the outer peripheral ring-shaped die pieces were more securely fastened, and the material cost and processing cost of the die were reduced.

The forging conditions were as follows: heating temperature for the material to be forged was 1000° C., the die heating temperature was 300° C., and the pressurization rate was 20 mm/sec. The hot forging die was examined after hot forging, and no failure such as crack was observed.

Figure 6:
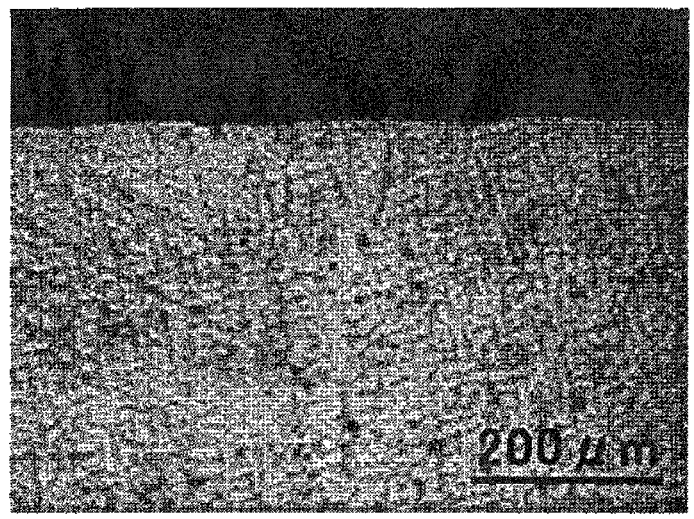
FIG. 6 is a micrograph of a cross section of the build-up layer having a preferred composition according to an aspect of the present invention.
Figure 7:
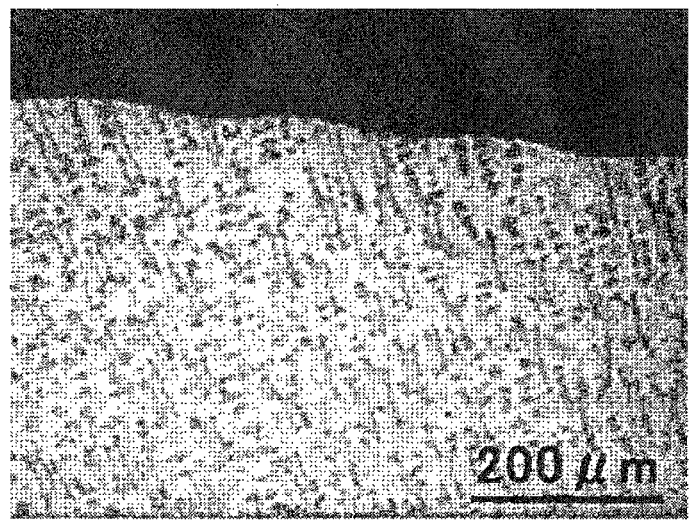
FIG. 7 is a micrograph of a cross section of the build-up layer according to an aspect of the present invention.

Subsequently, a test piece for observation of cross sections was taken from the working surface after build-up welding, and settling of the build-up alloy A and build-up alloy B was observed. The results are shown in FIG. 6 (build-up alloy A) and FIG. 7 (build-up alloy B). In FIG. 7, microscopic asperities were observed, and beginning of settling was confirmed. On the other hand, no asperity was observed on the build-up alloy A shown in FIG. 6, indicating that the alloy has a high strength.

The hot forging die of the present invention described above can be used as a large-sized hot forging die by changing the number and dimension of the outer peripheral ring-shaped die pieces.

Therefore, a hot forging die, which has been produced by cutting out from a several tons of large material, can be produced in a good yield.

In addition, the hot forging die of the present invention can be used as a die for large-sized hot closed die forging which has been difficult to be formed integrally by prior art, which may be used under conditions where the hot deformation resistance of the material to be processed is 300 MPa or higher, the surface temperature of the die to be brought into contact with the material to be processed is 500° C. or higher, and the compressive axial load is 150 MN or higher.

EXPLANATION OF REFERENCES

1 hot forging die
2 outer peripheral ring-shaped die piece
3 columnar die piece
4 build-up layer
5 intermediate layer
6 fixation jig
7 flange portion
8 ring-shaped die piece
9 stepped portion

The invention claimed is:

1. A hot forging die for closed die hot forging of a material to be forged, wherein the material to be forged is made of a nickel alloy or a titanium alloy, the hot forging die being for producing, as hot closed die forged products, turbine disks for aircraft jet engines and gas turbine disks for generation, by closed die hot forging of the material to be forged, the hot forging die comprising a plurality of ring-shaped die pieces which are combined concentrically and fastened with each other, wherein an axial direction of the ring-shaped die pieces is identical with a pressing direction when the material is forged, wherein a build-up layer of a nickel-base super heat-resistant alloy is formed by build-up welding the nickel-base super heat-resistant alloy on an upper surface of at least one of the plurality of ring-shaped die pieces of the hot forging die at a portion where the material to be forged is brought into contact with the hot forging die, and wherein a stepped portion for receiving the load imposed during forging is formed at on at least one of an inner periphery or an outer periphery of said at least one of the plurality of ring-shaped die pieces.

2. The hot forging die according to claim 1, wherein the plurality of ring-shaped die pieces are fastened by shrink fitting.

3. The hot forging die according to claim 1, wherein a composition of the build-up layer is, in terms of % by mass, B at 0.02% or less, C at from 0.01 to 0.15%, Mg at 0.01% or less, Al at from 0.5 to 2%, Si at 1% or less, Mn at 1% or less, Ti at from 1.5 to 3%, Cr at from 15 to 22%, Co at from 5 to 15%, Mo at from 3 to 6%, W at from 3 to 6%, Nb at 4% or less, Ta at from 1 to 7%, a content of Ta alone or the sum of Ta+2Nb being from 1 to 7%, and the balance being Ni and impurities.

4. The hot forging die according to claim 1, wherein a composition of each of the plurality of ring-shaped die pieces is in terms of % by mass, C at from 0.25 to 0.5%, N at more than 0 but 0.03% or less, Si at more than 0 but 1.2% or less, Mn at more than 0 but 0.9% or less, Al at from 0 to 0.5%, P at from 0 to 0.03%, S at from 0 to 0.01%, V at from 0 to 2.1%, Cr at from 0.8 to 5.5%, Ni at from 0 to 4.3%, Cu at from 0 to 0.3%, Mo at from 0 to 3.0%, W at from 0 to 9.5%, Co at from 0 to 4.5%, and the balance being Fe and impurities.

* * * * *